(12) United States Patent
Rodriguez (10) Patent No.: US 12,413,433 B2
(45) Date of Patent: Sep. 9, 2025

(54) METHOD AND SYSTEM FOR MANAGING POWER DELIVERY AND DEVICE OPERATION OVER A MESHED POWER OVER ETHERNET NETWORK

(71) Applicant: Jesus Rodriguez, Brick Township, NJ (US)

(72) Inventor: Jesus Rodriguez, Brick Township, NJ (US)

( * ) Notice: Subject to any disclaimer, the term of this patent is extended or adjusted under 35 U.S.C. 154(b) by 0 days.

(21) Appl. No.: 18/226,837

(22) Filed: Jul. 27, 2023

(65) Prior Publication Data
US 2024/0031179 A1   Jan. 25, 2024

Related U.S. Application Data

(63) Continuation of application No. 17/172,079, filed on Feb. 10, 2021, now Pat. No. 11,757,665, and a continuation of application No. 17/172,075, filed on Feb. 10, 2021, now Pat. No. 11,936,484, and a continuation of application No. 17/034,583, filed on Sep. 28, 2020, now Pat. No. 11,770,266, said application No. 17/172,079 is a continuation of application No. 16/892,768, filed on Jun. 4, 2020, now Pat. No. 11,032,089.

(60) Provisional application No. 62/912,695, filed on Oct. 9, 2019.

(51) Int. Cl.
| | | |
|---|---|---|
| *H04L 12/40* | (2006.01) | |
| *G06F 1/18* | (2006.01) | |
| *G06F 1/26* | (2006.01) | |
| *H04L 12/10* | (2006.01) | |
| *H05B 47/18* | (2020.01) | |
| *H05B 47/19* | (2020.01) | |

(52) U.S. Cl.
CPC .............. *H04L 12/10* (2013.01); *G06F 1/266* (2013.01); *H04L 12/40045* (2013.01); *H05B 47/18* (2020.01); *G06F 1/189* (2013.01); *H05B 47/19* (2020.01)

(58) Field of Classification Search
CPC ......... G06F 1/189; G06F 1/266; H04L 12/10; H04L 12/40045; H05B 47/18; H05B 47/19
See application file for complete search history.

(56) References Cited

U.S. PATENT DOCUMENTS

| | | | |
|---|---|---|---|
| 8,674,823 B1 * | 3/2014 | Contario | G01R 19/145 340/693.1 |
| 10,344,948 B1 * | 7/2019 | Gordin | F21V 11/04 |
| 2016/0204949 A1 * | 7/2016 | Theunissen | H04L 12/10 307/1 |
| 2020/0389330 A1 * | 12/2020 | Longardner | H02J 7/0045 |

* cited by examiner

*Primary Examiner* — Terrell S Johnson
(74) *Attorney, Agent, or Firm* — Andrew Morabito (57) ABSTRACT

The present invention is a system for providing power and controlling a plurality of components, comprising: a driver, wherein the driver provides for the control of the system and a gateway; a plurality of sensors, wherein the plurality of sensors collect sensor specific data and are in communication with the driver; a Power over Ethernet (POE) switch, wherein the POE switch is in communication with the plurality of sensors; and a plurality of devices in communication with the driver and the POE switch; wherein the plurality of devices and the plurality of sensors are routers for wireless connection between the plurality of sensors and the plurality of devices to the driver.

20 Claims, 5 Drawing Sheets

METHOD AND SYSTEM FOR MANAGING POWER DELIVERY AND DEVICE OPERATION OVER A MESHED POWER OVER ETHERNET NETWORK

CROSS-REFERENCE TO RELATED APPLICATIONS

This application is a continuation-in-part (and claims the benefit of priority under 35 USC 120) of U.S. application Ser. No. 17/172,079 filed Feb. 10, 2021, U.S. application Ser. No. 17/172,075 filed Feb. 10, 2021, U.S. application Ser. No. 17/034,583 filed Sep. 28, 2020 and U.S. patent Ser. No. 11/032,089 filed Jul. 4, 2020. The disclosure of the prior applications is considered part of (and is incorporated by reference in) the disclosure of this application.

BACKGROUND

This disclosure relates generally to a power over Ethernet (PoE) system, and particularly to the PoE system and the method of operation of the PoE system.

Presently, many buildings have complicated electrical wiring systems that are installed when the building is first built. These wiring systems are typically required to be installed by a certified electrician, and the placement of overhead lighting and electrical outlets is predetermined by the wiring system that is pre-installed in the building. After the building is built, adding, or moving fixtures or devices may be complicated and costly, requiring substantial re-wiring by an electrician.

Each light in a building may also be connected to a switch module that is used for turning it on and off. The placement of this switch is also pre-determined by the electrical wiring system when the building is first built. Moving the placement of the switch modules or altering the control of the switch later typically also requires an electrician to re-wire the relevant portion of the house, which can be very complicated and costly.

These existing electrical distribution systems are typically high voltage (100-250V) AC (alternating current). Newer lighting technologies, like LED (light-emitting diode) lights, are more efficient than incandescent and even fluorescent lighting. However, they are inherently low voltage DC (direct current) driven devices. Adapting these devices to work in an existing AC distribution system requires conversion of the power sources, resulting in additional costs and complications.

Power over Ethernet (PoE) is a technology for supplying low voltage current and data over a common point-to-point Ethernet network cable to locations with applications that require both mediums. In some cases, power is carried on the same conductors that carry data. In other cases, power is carried on dedicated conductors within the same cable. Applications that currently benefit from PoE technology include Voice over Internet Protocol (VoIP), IP cameras, wireless local area networks (WLAN), Wireless Access Points, and security and access control systems.

PoE has several advantages over traditional power systems used in homes and commercial buildings. For example, PoE systems are relatively low voltage, thus eliminating the need to run expensive high voltage wiring and conduit for lighting. In addition, installation of PoE wiring can be faster than with traditional power systems because Ethernet cabling employs simple plug-in end connections, such as RJ45. Where Ethernet cabling is already in place (i.e., for data transmission), PoE functionality can be achieved without the need for additional wiring installation.

The system should be inexpensive, easy to install, and easy to configure and control. The system should also be able to power and/or control other low voltage devices, such as occupancy sensors, photo detectors, wall switches and the like.

The power over Ethernet devices do not require separate power supply lines. In some instances, the power may be supplied by a power supply contained within an Ethernet switch or within the system. Due to this, the power supply does not generally have the power capability to supply maximum power to every port, there is a limit on the number of PoE devices that can be connected to a given power supply. A port may be denied power if it will result in oversubscription of the power supply. Example power over Ethernet devices that can benefit from receiving power over the Ethernet communication lines include an internet protocol telephone, a badge reader, a wireless access point, a video camera, and others.

Traditionally, when a power over Ethernet device is connected to a power supply, the power over Ethernet device is allocated a maximum power class. These maximum values correspond to the maximum amount of power that will be supplied by the power supply to the power over Ethernet device.

Therefore, it is desired for a PoE system that provides for ease of installation within the building, simplification of the integration of new devices, and a user-friendly experience to control and use the PoE system.

SUMMARY

In a first embodiment, the present invention is a system for providing power and controlling a plurality of components, comprising: a driver, wherein the driver provides for the control of the system and a gateway; a plurality of sensors, wherein the plurality of sensors collect sensor specific data and are in communication with the driver; a Power over Ethernet (POE) switch, wherein the POE switch is in communication with the plurality of sensors; and a plurality of devices in communication with the driver and the POE switch; wherein the plurality of devices and the plurality of sensors are routers for wireless connection between the plurality of sensors and the plurality of devices to the driver.

In a second embodiment, the present invention is a mesh Power over Ethernet (POE) system, the system comprising: a driver, wherein the driver has a control module and the control module is able to send and receive commands; a POE switch in communication with the driver, wherein the POE switch sends and receives information from the driver; a plurality of components in communication with the driver and the POE switch; a power source in wired communication with the POE switch, and wherein the control module processes a first set of data received by a first group of the plurality of components, and generates a set of actions which are sent from the driver to the POE switch to control at least one of a second group of the plurality of components, and wherein the driver operates as a gateway to a mesh network comprised of the plurality of components.

In a third embodiment, the present invention is a method of controlling and connecting components in a meshed power over ethernet (POE) system, the method comprising: a driver receiving a power and a control signal from at least one component within a mesh network; and a control module processing the received power and the received control signal, wherein the control module determines if the at least one component is operating with a predetermined range, wherein if it is determined that the at least one component is not operating within the predetermined range.

DETAILED DESCRIPTION

The present invention generally relates to PoE systems and provides several advantages over the present designs. The present PoE lighting system is unique in that it is an entire system and not a single component requiring the integration of other system. The present invention provides for a means to connect many devices, fixtures, sensors, or electrical components (hereinafter referred to as devices) together through a hybrid wireless and wired PoE system. unlike the present systems that require purely wired connections to form the PoE system or are limited based on ethernet protocol for wireless connections, the present PoE system uses all internal components which are all able to communicate with one another through wired or wireless connections. The present PoE system improves communication by using a predominately wireless mesh system design that has an extended range of up to two thousand (2,000) feet, where the previous systems had a limitation of around three hundred and thirty (330) feet based on ethernet protocols that acted as limiting factors for the range of communication. The elimination of the light controller, and the use of a cloud-based management system, the PoE system increases efficiency, reduces costs, and improves the versatility of the system. The system further eliminates the need for an independent gateway/driver combo and uses drivers in the devices and the independent drivers to act as gateways to connect devices to one another in the mesh network.

The present invention removes the necessity of this element and further simplifies the PoE system. With the integration of the cloud-based system and the mesh network of the devices, this increases the number of devices which can be integrated into the PoE system, and the overall area covered by the PoE system to be increased far beyond the known limitations of typical PoE systems. While also allowing an extended wireless range and also allowing each device to act as a gateway or wireless connection point for further devices. Through the use of a wireless controller, the present PoE system can manage up to ten thousand (10,000) devices. The requirement of the need for cable interconnection between the devices and the gateway has been removed, providing a massive increase in the versatility of the system by allowing for the devices to be placed virtually anywhere provided they are within wireless range of another driver or device for communication and data transfer.

The system does not require an additional power supply to power downstream devices such as but not limited to wall switches, motion sensors, cameras, various detection devices (e.g., smoke detectors, motion detectors, or the like) or other electronic sensors or devices. The system does not require the switches to be physically connected to turn the lights, fixtures, or sensors on or off. The system does not require an in-room controller to manage connectivity to the devices The system is able to manage all devices via the wireless mesh connection, where a wired connection is not present. Additionally, the system is not limited to the number of devices or location of devices it can simultaneously control. The system is able to manage and control an unlimited number of devices via the wireless controller. Unlike other systems that use slave controllers to manage downstream devices thus making them inherently fault intolerant, the present system does not have any such limitation and if one device in the network fails only that device fails and all other devices on the network remain operational due to the ability to reroute the wireless mesh connection between the devices and the drivers. The present invention had an advantage over existing systems because existing systems require the use of costly site control servers to manage the operation of each device, and the present system embeds control software in each wireless chip in each device that connects directly to the cloud server, eliminating the need for a costly onsite control server.

The present PoE system is powered by a network switch using power over ethernet technology (PoE). The system is able to reduce energy consumption by up to 80% over traditional fluorescent lighting and 50% over standard high voltage LED lighting, and an additional 10% with the incorporation of sensors. In a system where there are multiple types of devices, the present system is about to reduce energy consumption based on the device type and sensors. Additionally, the present system can be used as a full-time system or an emergency lighting system. The system is also intelligent and is managed by a cloud server allowing for the management of each device individually or a group of devices and is highly adjustable/modifiable. There is no need for an in-house lighting controller, there is also redundancy built into the system in the case of an internet or power outage. The system uses wireless technology for data communication allowing for a more efficient communication method that does not suffer from traditional emf interference that is experience when higher than normal voltage is run through bundled communication cabling.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
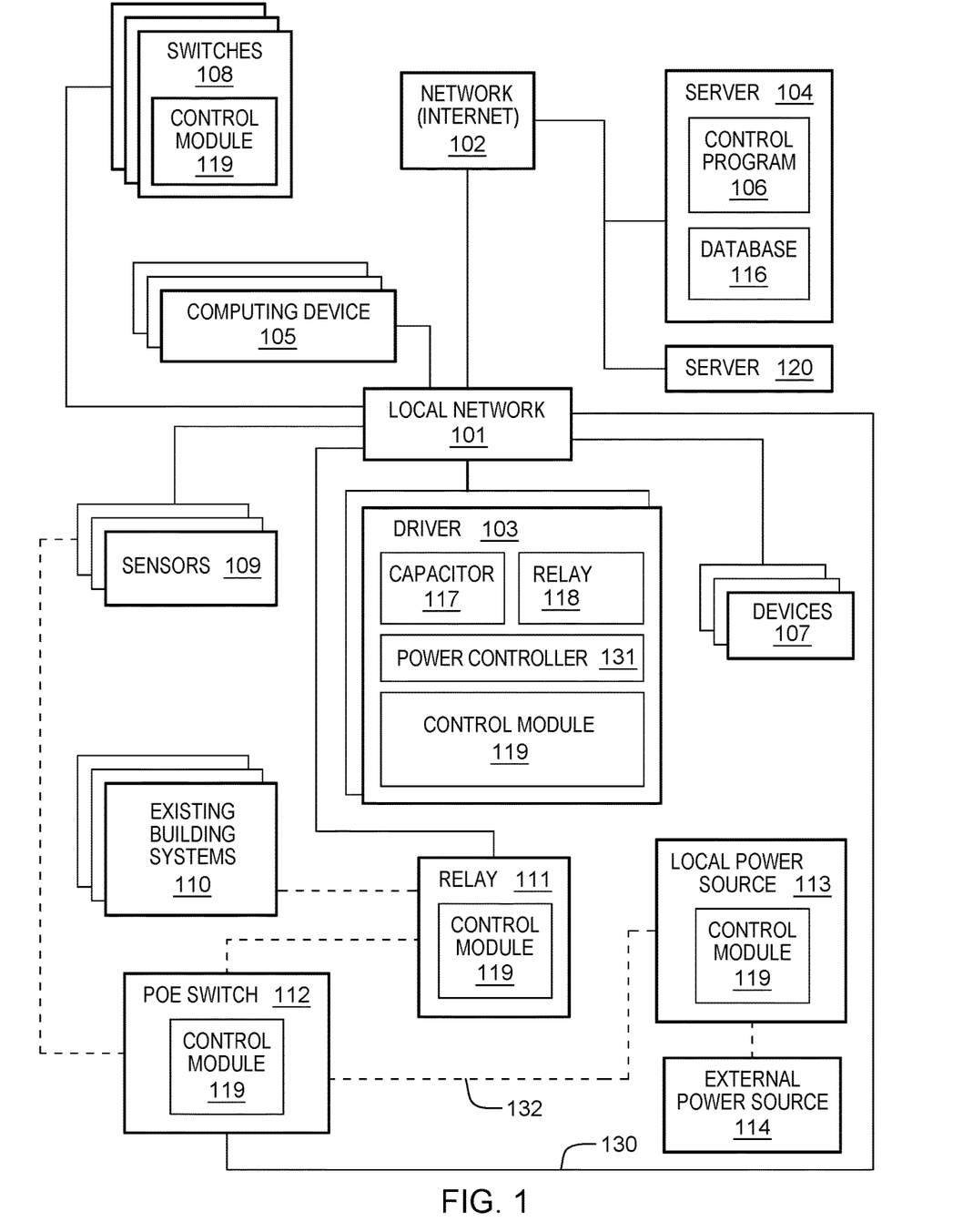
FIG. 1 depicts a block diagram depicting a PoE environment, according to an embodiment of the present invention.

FIG. 1 depicts a block diagram of a PoE environment 100 in accordance with one embodiment of the present invention. FIG. 1 provides an illustration of one embodiment and does not imply any limitations regarding the environment in which different embodiments maybe implemented.

In the depicted embodiment, PoE environment 100 includes local network 101, network 102, server 104, computing devices 105, driver 106, devices 107, switches 108, sensors 109, existing building systems 110, relay 111, PoE Switch 112, local power source 113, external power source 114, and server 120. PoE environment 100 may include additional servers, computers, or other devices and PoE devices not shown.

The local network 101 may be a local area network (LAN), a wide area network (WAN) such as the Internet, any combination thereof, or any combination of connections and protocols that can support communications between computing device 105, and server 104 in accordance with embodiments of the invention. Network 101 may include wired, wireless, or fiber optic connections. In the depicted embodiment, the local network 101 connects computing devices 105, driver 106, switches 108, sensors 109, relay 111, and PoE Switch 112. Network 101 may also be a mesh network, where the nodes (e.g., components, devices, sensors, switches, etc.) are connected directly, dynamically, and non-hierarchically to as many other nodes as possible and cooperate with one another to efficiently route data to and from the nodes. The mesh network 101 is dynamic in that as nodes are added and removed, the connection between the nodes is modified or adjusted. The mesh network may be wireless, wired, or a hybrid of both.

The network 102 may be a local area network (LAN), a wide area network (WAN) such as the Internet, any combination thereof, or any combination of connections and protocols that can support communications between computing device 105, and server 104 in accordance with embodiments of the invention. Network 102 may include wired, wireless, or fiber optic connections. In the depicted embodiment, the network 102 connects servers 104 and 120 with the local network 101.

The server 104 may be a management server, a web server, or any other electronic device or computing system capable of processing program instructions and receiving and sending data. In other embodiments server 104 may be a laptop computer, tablet computer, netbook computer, personal computer (PC), a desktop computer, or any programmable electronic device capable of communicating via network 102. In one embodiment, server 104 may be a server computing system utilizing multiple computers as a server system, such as in a cloud computing environment. In one embodiment, server 104 represents a computing system utilizing clustered computers and components to act as a single pool of seamless resources. In the depicted embodiment, database 116 and control program 106 are located on server 104. Server 104 may include components, as depicted, and described in further detail with respect to FIG.

3. In some embodiments, server 104 is a cloud service platform or a web service cloud-based service platform.

Control program 106 controls the operations of the devices 107 based on the data received and processed from the sensors 109, processes the data received from the sensors 109 existing building systems 110, switches 108, and the like. In the depicted embodiment, Control program 106 utilizes network 102 and network 101 to access the driver 103 and the relay 111, PoE Switch 112, and sensors 109. In the depicted embodiment, Control program 106 resides on server 104. In other embodiments, Control program 106 may be located on another server or computing device, provided Control program 106 has access to database 116, driver 103 and the relay 111, PoE Switch 112, and sensors 109. The control program 106 is able to set features such as, but not limited to circadian rhythm, and timers.

Database 116 may be a repository that may be written to and/or read by control program 106. In one embodiment, database 116 is a database management system (DBMS) used to allow the definition, creation, querying, update, and administration of a database(s). In the depicted embodiment, database 116 resides on server 104. In other embodiments, database 116 resides on another server, or another computing device, provided that database 116 is accessible to Control program 106.

The computing device(s) 105 may be a management server, a web server, or any other electronic device or computing system capable of processing program instructions and receiving and sending data. In some embodiments, computing device 105 may be a laptop computer, tablet computer, netbook computer, personal computer (PC), a desktop computer, or any programmable electronic device capable of communicating with computing device 105 and server 104 via network 102. In other embodiments, computing device 105 may represent a server computing system utilizing multiple computers as a server system, such as in a cloud computing environment. In another embodiment, computing device 105 represents a computing system utilizing clustered computers and components to act as a single pool of seamless resources. In embodiments, computing device 105 may include any combination of Control program 106 or database 116. Computing device 105 may include components, as depicted, and described in further detail with respect to FIG. 3. In the depicted embodiment the computing device 105 is connected to the local area network 101 through a wireless 130 connection. In other embodiments, the computing device 105 may be connected to the local area network 101 and other components of the system through wired 132 or wireless 130 connections. The wired connections have a limitation of three hundred (300) approximate feet for both power and data to be transferred via the ethernet cable. This limitation thus seriously limits a purely wired system to a module or communication device every three hundred feet. The wireless system has a range of approximately fifteen hundred (1,500) feet for the transfer of data, which provides an advantage over the wired system and allows the devices and modules to communicate with fewer control modules between them.

The driver 103 allows for the powering of devices 107 and communicating with the sensors 109, switches 108, and other devices (such as sensors, relays, locks, switches, communication devices, tracking devices, etc.) that integrated into the mesh network. The driver 103 has been built with a special capacitor 117 to allow for a charge to be maintained allowing the devices 107 to turn on without the customary delay. Additionally, the driver 103 has an embedded wireless component that allows for the control program 106 to communicate directly with the driver 103, thus acting as a gateway. In some embodiments, the wireless component (e.g., devices 107, sensors 109, and switches 108) acts as routers to allow for indirect communication to the driver 103 and thus to networks 101 and 102. Within the driver 103 is a self-contained wireless network that allows for the use of a computing device 105 to be used in the event of an internet outage.

The driver 103 has a wireless system which provides for the wireless communication with the network 101 and all the devices and components wirelessly connected to the network 101, thus acting as a gateway to the devices and components within the network 101. In some embodiments, the driver 103 has a different MAC address for wireless communication over a secure wireless network. The PoE interface embeds two active bridges and the driving circuitry, a charge pump to drive high-side MOSFETs, the hot swap MOSFET, and the standard single-signature IEEE 802.3bt-compliant interface, including detection, classification, UVLO, and inrush current limitation. In some embodiments, the driver 103 is capable of handling power up to 48-W output with high efficiency (up to 95%), good current regulation, low standby consumption, and low current ripple.

On powering up the driver 103, the power is provided directly through the POE switch 112. In some embodiments, this is through a UPoe (802.3 bt) switch. The driver 103 has a built-in control module 119 for the transmitting, receiving, and process of data and provides the driver with the ability to communicate with the other control modules 119 within the system 100.

In embodiments where the driver 103 is the only gateway within the mesh network, additional drivers 103 may be added to the network to provide additional gateways for the mesh network as a whole. In some embodiments, certain devices 107, sensors 109, switches 108, or computing devices 105 may become gateways as well based on the mesh network (and the system 100) desired functionality and requirements.

In an embodiment, where the devices 107 are light fixtures, the devices 107 turn ON with maximum brightness. The dimming, temperature control and ON/OFF of the devices 107 can be controlled by using a switch 108 or sensor 109 or a computing device 105 through the control program 106. The control program 106 communicates with the networks 101 and 102. The driver provides for the control of the devices 107. For example, the ON/OFF of the devices 107 is controlled by clicking on the on and off icon, and the brightness of the devices 107 can be changed by adjusting the slide bar icon and changing the color temperature is done by choosing the color temperature range programmed for each individual light fixture. Based on the selected dimming level, driver 103 adjusts the duty cycle signal going to the device 107. In some embodiments, the frequency of the driver 103 ranges from 1.9 gHz to 2.4 gHz. With the ability to increase the Hertz of the driver 103, the radius for which the driver 103 can connect devices 107 greatly increases, from 20 km to up to 3000 km. In some embodiments the devices 107 are doors, door switches, windows, window locks, security systems, and other devices which are part of buildings or structures which can be controlled through electronic means.

The overall efficiency, current regulation, and dimming behavior of the driver 103 has been evaluated at different loads. With 100% load at 48 VDC, the efficiency is above 95%, the driver 103 performance in terms of dimming behavior, current regulation, and efficiency. The standby power consumption is less than 100 mW.

The present driver 103 does not require a physical switch to control the devices 107. Nor does the driver 103 require hardwired switches 108 to function or operate. The current invention does not require slave configuration for operation of downstream devices.

The driver 103 is able to understand the connection of the devices 107 so that adequate power is sent to the devices 107 in series so that all the devices 107 receive adequate power to operate. The driver 103 is able to take into account any internal power sources each device 107 has or any external power sources each device 107 may be connected to. In some additional embodiments, the device(s) 107 may have battery or internal power storage devices that affect the driver 103 power supply.

The relay 118 may be integrated into the driver 103 to provide another approach involves self-contained battery pack emergency light. The relay 118 is connected to normal power, which provides a constant charging current for the battery. During a power failure, the relay 118 energizes the emergency devices.

In one embodiment, the driver 103 allows for a constant-current smart driver capable of working on Ethernet RJ-45 cable for delivery of power only and wirelessly controlled through Wi-Fi at 2.4 ghz or 1.0 ghz. The power supply for the LED driver is capable of operating from 37- to 57-V input DC voltage, with a maximum power output of 48 W. The board features digital/PWM dimming, with the depth of PWM dimming close to 1%. The smart dimming and ON/OFF of the LEDs, color temperature controls, timer control functionality is controlled through an onboard control module. The driver 103 provides for the standby power (no load) consumption. The driver's converter efficiency reaches 95% for most of the input voltage range. All protection features like LED open and short are present in the developed solution.

In some embodiments, the driver 103 has a power controller 131, which is used for driving the devices 107 in constant-current mode. Due to the high-frequency operation of the power controller. The power controller has a DIM pin for digital dimming and an EN pin for implementing driver ON and OFF. The power controller has a built-in protection mechanism to manage faults both at source and load side.

The devices 107 are various types of mechanical or electrical instruments, machines, or pieces of equipment that are connected or integrated into the system 100. These devices can be light fixtures, fans (ceiling fans, HVAC, etc.), automatic or electronic doors, elevators, security systems, fire detection and alarm systems, various sensors (e.g., air quality sensors), water management systems, outlets, street light poles, televisions, monitors, computers, or the like which has the ability to be integrated into the POE system. The device only requirement is the ability to wirelessly communicate with other devices 107 in the network, and if an internal power source is not a part of the device, is connect wired to the PoE system for at least power. In some embodiments, there are groups of devices 107 that are wired or wirelessly connected to the driver 103, and groups of devices 107 that are wired or wirelessed connected to other components of the system 100. In some embodiments, the devices 107 may only be wireless connected to the driver 103 if they have a separate power source such as an internal power source (e.g., solar panels, battery, or the like). This is because some devices 107 may be wired based on proximity to the driver 103 or may be wirelessly connected. In additional embodiments, devices 107 may be wirelessly connected to one another so as to provide extended distance from the driver 103 to the devices 107. In this setup some of the devices 107 act as routers, access point, or wireless network extender to allow the increase distance from the driver 103 while not limiting the communication between the driver 103 and the device 107. In some embodiments, devices 107 may become gateways depending on the network 101 design.

Devices 107 having wireless communication and wireless signal transmission, the devices 107 provided at least one is connected to the driver 103, the entire system of devices 107 can be wirelessly connected and communicate. The devices 107, in an embodiment, form a mesh network due to the driver's 103 ability to distribute the network management tasks to the devices 107. This formed of decentralized operation setup allows for each device to act as a router or gateway, sending and receiving data in the network 101 based on the need of the network 101. The devices 107 are able to connect to one another through a channel selection and optimizing the path from the gateways and routers to each of the connected devices 107.

The network 101 may be dynamic in the connection between the nodes (driver 103 devices 107, switches 108, sensors 109, computing devices 105, etc.) to maintain an optimized connection as nodes are added or removed from the network 101. For example, if a device 107 is removed or broken, the nodes are able to reroute the connection or convert a node into a router or gateway to allow a new connection path between the nodes so as to not loose connectivity between all the remaining nodes of the mesh network.

In another embodiment, the mesh network 101 may have multiple sub networks which are identified within the larger mesh network 101. For example, a low energy network and a high-performance network may make up the mesh network 101 based on the desired power requirements and data transfer speeds of and between the nodes.

Thus, creating a PoE system unlike before where some devices 107 may be powered and communicate through a wired system where other devices 107 may be powered through an internal power supply and have a wireless communication. Creating a system which provides for fewer cables and the ability to expand the system with ease.

The direct connection within the environment 100 may be a category 6A U/UTP CMP/CMR cable or the like which is able to meet the power and signal requirements of the driver 106. This provides for the PoE connection to provide both power and control signals from the driver 103 to the devices 107. In some embodiments, devices 107 may have an integrated power source (e.g., battery, solar panel, municipal power, or the like). In other embodiments, devices 107 may be connected to the local power source 113 through relay 111 which controls the power supplied from the power source 113 to the device 107.

In some embodiments, the devices 107 are light-emitting diode (LED), the LEDs are activated and turn on quickly and can be readily dimmed. LEDs emit a cool light with very little infrared light. An LED circuit will approach 80% efficiency, which means 80% of the electrical energy is converted to light energy; the remaining 20% is lost as heat energy.

The switches 108 are used to provide operation and control of the devices 107. In some embodiments, the switches 108 control the sensors 109 as well. The switches 108 are either hardwired into the system or, based on more recent technology may be able to be wirelessly connected to the local area network 101. The switches 108 may have various features such as dimming, time controlled, or other features to activate, deactivate the devices 107 or sensors 109. In the depicted embodiment, the switches 108 are connected to the local area network 101 through a wireless connection. In other embodiments, the switches 108 may be hardwired into the system 100.

The sensor(s) 109 are used to provide the data collection for the driver 103 to determine if the requirements have been met to activate or alter the functioning of devices 107. The sensors 109 may also be a multi sensor, which allows for the detection of motion, daylight, heat, temperature, and humidity using a wireless component that has been built into the sensors 109 to allow for direct communication to the control module. In some embodiments, the sensors 109 may be able to detect various chemicals, gases, or the like. In some embodiments, the sensors 109 are simple switches as currently designed. The use of the motion sensor will allow for the light to be turned on when it detects motion or in the event that an individual is in an office at his desk but not moving enough to trip the motion sensor it will detect the individuals body heat and activate the lights. The daylight sensor 109 will allow for the integration of daylight harvesting and a circadian rhythm setting to maximize the efficiency of the systems. The sensor 109 is self-contained as it does not require a power cable and runs off of battery power. In another embodiment, the sensor 109 may be hardwired and connected to power via the PoE switch.

Sensors 109 have a built-in control module for transmitting data with regards to sending the data received from the sensors 109, as well as process the requests sent to the sensors 109 from various elements of the system 100. The sensors 109 are replaceable and adjustable and are able to be wirelessly or wired to the various components of the system. The sensors 109 can be integrated into the system provided they are able to communicate with the driver 103 and/or the POE switch 112.

The sensors 109 and the switches 108 may also be used similar to the devices 107 as a routers or gateways within the network to allow for the data transfer within the mesh network.

The existing building systems 110 may also include fire or burglary components or systems integrated into the building which are connected to the system, such that when these building systems 110 are activated, the driver 103 provides a response action from or to the devices 107. The fire alarm interface, which will enable any number of pre-determined scenes to be activated in the event that the fire alarm at the facility is triggered. System 110 can be set to turn all facility lights to max power allowing for the safe evacuation of tenants and guests. The burglar alarm interface will enable any number of pre-determined scenes to be activated in the event that the burglar alarm at the facility is triggered. The system 110 can be set to turn all facility lights to max power allowing in an effort to thwart any wood be criminals and to enable the safety conditions for security and or police additionally the motion sensor can be used to trigger the recording feature of any security cameras in the vicinity.

Relay 111 is a PoE operated switch which controls the communication between the PoE switch 112 and the existing building systems 110. Relay 111 has a built-in control module 119 for the transmitting, receiving, and process of data and requests and permits the relay 111 to perform the desired action based on the data.

The Power over Ethernet (PoE) Switch 112 supplying power and data through a standard Ethernet cable is commonly called "Power-over-Ethernet," or PoE technology which has an industry standard protocol called IEEE 802.3af/bt. An embodiment of the present invention supports the IEEE 802.3af/bt standard as well as a customized, novel PoE architecture which allows a user to select a multiple number of desired voltages and current levels for an output PoE port by instructing a microprocessor using an output voltage-adjusting interface. It is known that there are currently two standards for PoE systems: Institute of Electrical and Electronics Engineers (IEEE) 802.3af (the original PoE standard) provides up to 15.4 Watts of power, and IEEE 802.3bt (known as PoE plus) which provides up to 60 or 100 Watts. As new standards are developed or designed, this system is able to work with the new standards. The switch 112 has a built-in control module 119 for the transmitting, receiving, and process of data and requests and permits the switch 112 to perform the desired action based on the data.

In some embodiments, the driver 103 derives its power from the PoE switch 112. In some embodiments, the PoE switch 112 is an IEEE 802.3BT PoE switch and is only used for delivering power to the driver 103 but is not used for communication to the driver 103 in an effort to avoid any EMI communication disruption due to the higher-than-normal power.

The local power source 113 is an uninterruptible power supply that provides constant and continuous power to the system with minimal disruptions in the power supply. Both in an emergency or on a regular basis the local power source 113 may be used. The local power source 113 is connected to the external power source 114 and may be a passthrough device for the power supply or may be charged by the external power source. 114. In one embodiment the local power source 113 provides for 3000 watts for every three switches 112 allowing for the use of up to 75 devices 107 during a power outage at full power the light will remain functional on battery power for 120 minutes. At half power we can extend the battery life and allow the lights to stay on for 240 minutes. The local power source 113 also has a built-in control module 119 to allow communication with the other control modules 119, the driver 103, and the control program 106. The control module 119 transmits data with regards to grid power levels, battery life, battery charge levels and charge rate. This information is used to determine whether the battery is on grid or battery power to allow the system to determine if the emergency lighting scenario needs to be implemented. The battery along with the control module 119 allows for an independent control of a lighting system.

The external power source 114 may be various forms of renewable energy such as solar, wind, water, or the like forms of energy. In some embodiments, the external power source 114 is an established power system or structure, for example, city or municipal provided power.

The server 120 may be a management server, a web server, or any other electronic device or computing system capable of processing program instructions and receiving and sending data. In other embodiments server 120 may be a laptop computer, tablet computer, netbook computer, personal computer (PC), a desktop computer, or any programmable electronic device capable of communicating via network 102. In one embodiment, server 120 may be a server computing system utilizing multiple computers as a server system, such as in a cloud computing environment. In one embodiment, server 120 represents a computing system utilizing clustered computers and components to act as a single pool of seamless resources. In the depicted embodiment database 108 is located on server 120. Server 120 may include components, as depicted, and described in further detail with respect to FIG. 3. Server 120 would be a lightweight publish and subscribe system where you can publish and receive messages as a client. MQTT Server 120 is a messaging protocol, designed for constrained devices with low bandwidth.

Figure 2:
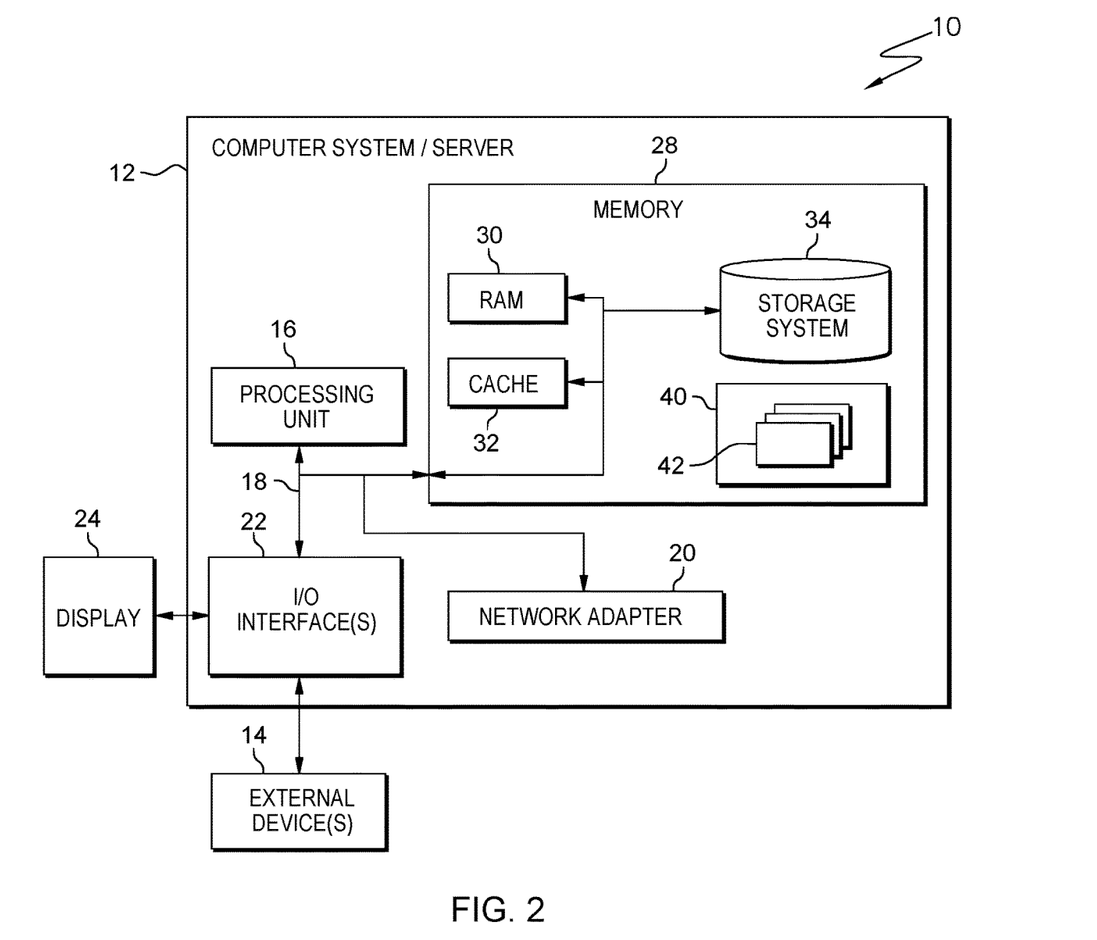
FIG. 2 depicts a computing node, according to an embodiment of the present invention.

Referring now to FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
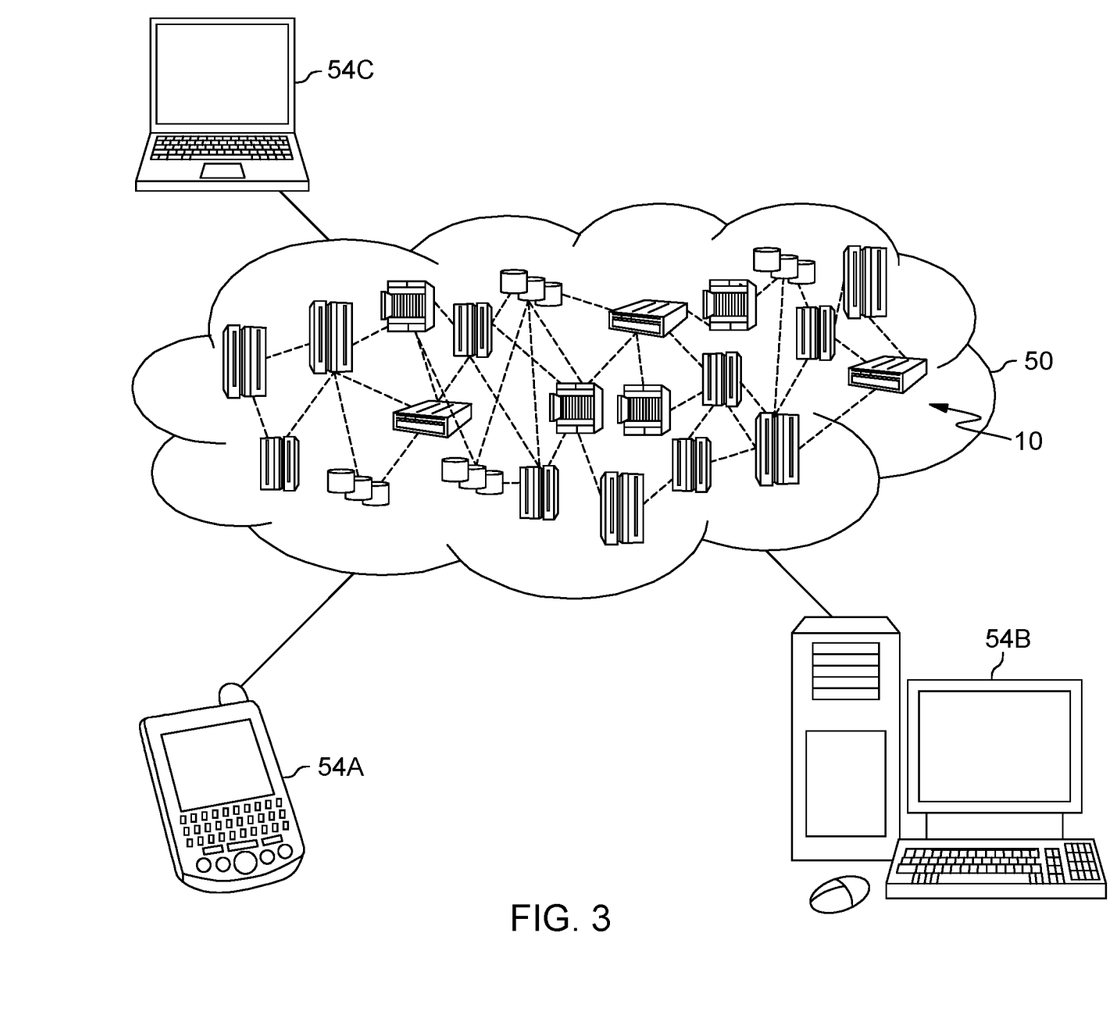
FIG. 3 depicts a cloud computing environment, according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and laptop computer 54C may communicate. Nodes 10 (e.g., devices 107, sensors, 109, and switches 108) may communicate with one another. The nodes 10 can connect directly, dynamically and non-hierarchically to as many other nodes 10 as possible and cooperate with one another to efficiently route data to and from the devices. They may be grouped (e.g., array) (not shown) physically or virtually, in one or more networks, such as Private, Community, Public, mesh network, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 3 are intended to be illustrative only and that computing nodes 10 and cloud computing environment 50 can communicate with any type of computerized device over any type of network and/or network addressable connection (e.g., using a web browser).

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
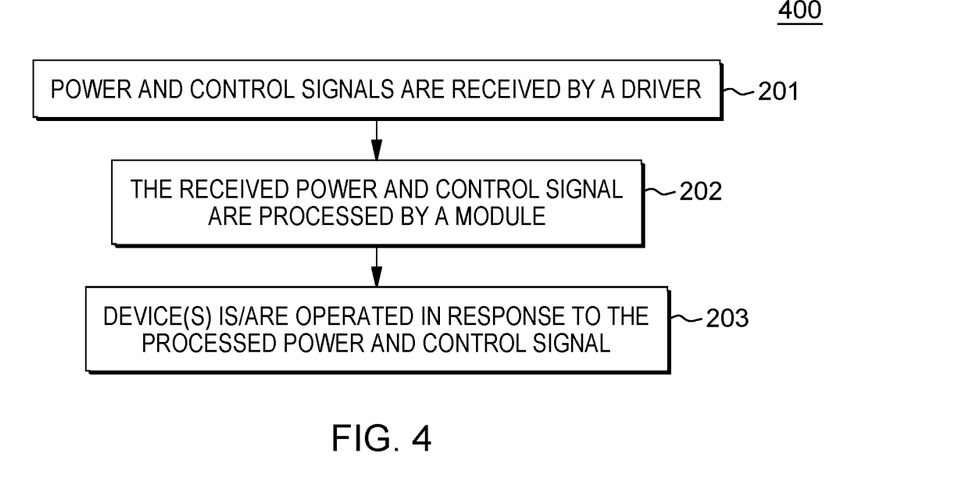
FIG. 4 depicts a flowchart of the operational steps of an exemplary method of operating the disclosed PoE system within the PoE environment of FIG. 1, according to an embodiment of the present invention.

FIG. 4 shows flowchart 400 depicting a method according to the present invention. The method(s) and associated process(es) are now discussed, over the course of the following paragraphs, in accordance with one embodiment of the present invention. Additionally, steps of the method 400 may be performed in varying orders or concurrently. Furthermore, various steps may be added, subtracted, or combined in the method 400 and still fall within the scope of the present disclosure.

A method 400 to operate the devices 107 is described. In step 201, the driver 103 receives the power from the PoE Switch 112 and the control signal over the network 102, for the groups or arrays of devices 107, or a combination of the two. The received power and control signal are associated with the device 107 power usage, power requirements, control settings, sensor data, and the like. In step 202, the control program 106 analyzes the data collected by the driver 103 to determine if the devices 107 are operating within the set requirements or parameters set forth by the user or the system and are within the program requirements. The program may be normal operation, emergency, low power consumption or the like. In step 203, the control program 106 communicates with the driver 103 to control the operation of the respective device(s) 107 based on the processed power and control signal, through the wired connection between the driver 103 and the device(s) 107 the driver is able to maintain or alter the power supplied to the device(s) 107, control the device(s) 107 to act in a predetermined manner is managed over the wireless network (e.g. on, off, change color, change color temperature, dim the lights, and additional actions which the lights are able to perform).

The power and control signals processing is typically interrupted by the sensors 109, where a request to operate the device 107 is requested. In some embodiments, the driver 103 controls the temperature of the devices 107 which relate to the light output of the device 107. In additional embodiments, the interruption may come from the alteration or instability of the incoming power supply, and various other factors which can occur to the devices 107. For instance, if a device 107 experiences an error or malfunction, the driver may receive information related to the malfunction and cut power to the device(s) 107 to stop further damage and provide a notice to the control program 106 which communicates with the computing device 103 for the required personnel to investigate the malfunction. In some embodiments, the PoE system 100 performs a self-diagnostic procedure to determine if the malfunctions or issues are able to be fixed remotely. Similar for the sensors 109 if one is providing inaccurate or inconsistent control signals. In some embodiments, the control signals are conditioned and provided to the driver 103. The conditioning may be due to the relay or capacitor.

Figure 5:
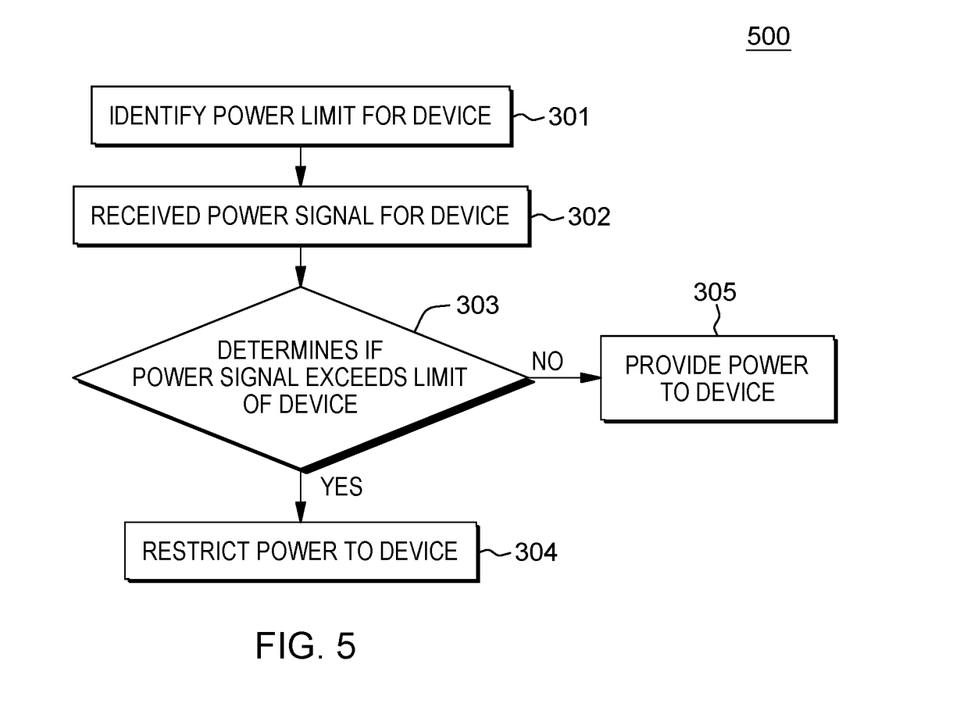
FIG. 5 depicts a flowchart of the operational steps of an exemplary method of monitoring the disclosed PoE system within the PoE environment of FIG. 1, according to an embodiment of the present invention.

FIG. 5 shows flowchart 500 depicting a method according to the present invention. The method(s) and associated process(es) are now discussed, over the course of the following paragraphs, in accordance with one embodiment of the present invention. Additionally, steps of the method 500 may be performed in varying orders or concurrently. Furthermore, various steps may be added, subtracted, or combined in the method 500 and still fall within the scope of the present disclosure.

In one example, unless the context indicates otherwise, these steps may be performed by control program 106; however, they may also be performed by suitable hardware or software such as by computing device 103 having suitable logic for implementing these described steps.

The method 500 begins at step 301 where a power limit is allocated for each device 107. This may be performed automatically by control program 106, by a user through computing device 103, or through other suitable methods. According to the teachings of the invention, the allocated power limit for each device may include values other than those specified by IEEE or set by the device 107. After allocation of a power limit for each device 107, power is provided to any device 107 sending a power signal request at step 302. The power limit allocated for each device may be stored in the database 108, or in other suitable locations. At decision 303, the power usage is measured for each device 107 requesting power. In some embodiments where devices 107 are connected in series, the power consumption of each device 107 is factored into the power compunction requirements for that series of devices 107. If it is determined that the power exceeds the limit of the device 107 at the time, the control program 106, or the like reduces the power supplied to that device 107. If the control program 106 determines that the power does not exceed the limit for the device 107, the control program 106 communicates with the driver to continue supplying the device 107 the power 305. The system is also able to determine if the device 107 has an internal power source (e.g., battery) and the capacity of said power source as well if the power source is at capacity or not, or determine if the device 107 has a renewable power source and the functioning of said renewable power source.

This determination may be based upon an overall power usage determination that occurs independently of this method or may involve specifically determining the power usage for this purpose. Such determination of an overall power usage may involve measuring the overall power usage or measuring power usage for each device 107. This may be implemented in an emergency situation where the power source is nearly depleted of power, or the power has been severed and the backup power supply is being used. It may also apply to situations where the devices 107 are to be dimmed to accommodate the absence of personnel in the room or building. In some emergency situations the driver can control the various devices 107 based on the data received from the sensors 109 to block or lock the people from entering areas of the building which are consumed by fire, gas, smoke, or are otherwise dangerous and direct the people out of the building through a safe and clear path. This can be implemented in different situations and events such as fires, gas leaks, shooters, or the like. In some events the system can be designed to trap or contain individuals who are not permitted to be in the building.

Figure 6:
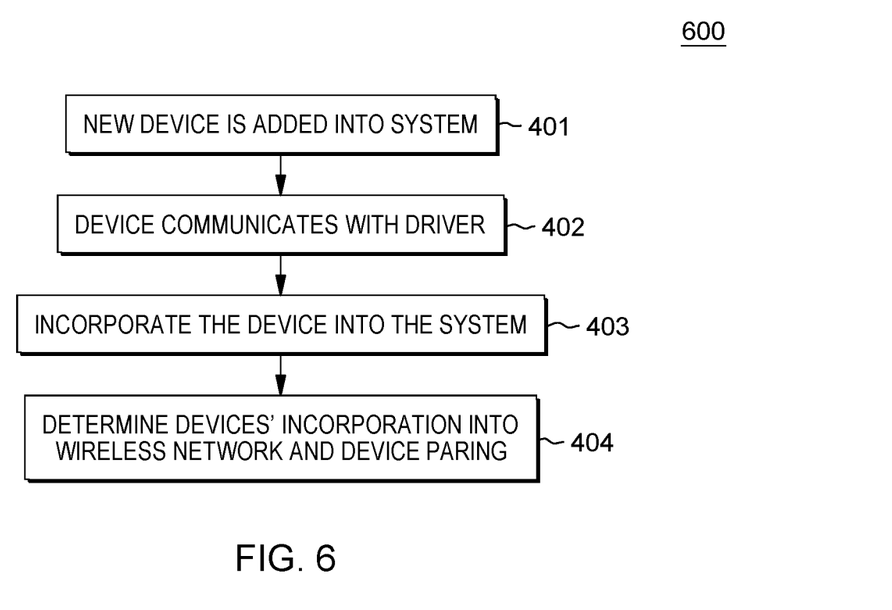
FIG. 6 depicts a flowchart of the operational steps of an exemplary method of integrating additional devices into the disclosed PoE system within the PoE environment of FIG. 1, according to an embodiment of the present invention.

FIG. 6 shows flowchart 600 depicting a method according to the present invention. The method(s) and associated process(es) are now discussed, over the course of the following paragraphs, in accordance with one embodiment of the present invention. Additionally, steps of the method 600 may be performed in varying orders or concurrently. Furthermore, various steps may be added, subtracted, or combined in method 600 and still fall within the scope of the present disclosure.

The exemplary method for a sequence that may be deployed by the control program 106 when a new device(s) 107 is added to the system 100. The method 600 may be performed by a computing device 103, server 104, or any other computing device with software components of the control program 106.

In step 401 a new device(s) 107 is added into the system. In some embodiments, a new switch 108 or sensor 109 is added to the system 100 and the same process is applied. The addition of the device(s) 107 may be physically connecting the device to the PoE system via a wired connection or may be connecting the device(s) 107 through a wireless connection. In some embodiments, if the device 107 has an internal power supply, the wired connection does not transfer power to the new device 107, thus modifying the flowchart 500 calculation. In step 402, the new device 107 communicates with the driver 103 or the control program 106 to allow transfer of data and/or power between the device 107 and the driver 103. This step provides the driver 103 or control program 106 with the features and functionality of the new device 107 to determine the type of device 107 and the grouping (if necessary) of the new device 107. The new device 107 may not communicate directly with the driver 103, as the new device 107 may, in the mesh network, connection with a device 107 within range and the data from the new device 107 is transferred to the driver 103 through the mesh network nodes. In step 403, the user, driver 103, or the control program 106 incorporates the device(s) 107 into system 100 based on the device type, the device features, and the device requirements. This may include a basic integration into the set of devices 107 already incorporated in the system 100 or may be able to automatically group the device(s) 107 with similar or associated devices 107. The devices 107 are integrated into the system and the type of device or operation of the device in a group or array is identified, categorized, and set predetermined functioning parameters. In step 404, it is determined if the device 107 is able to function as a gateway, router, or access point for the transfer of data to devices 107 which are out of reach of the driver 103, and to adjust or modify the mesh network setup to allow for the most efficient connection between the nodes of the mesh network. Based on the type of mesh network component the new device 107 can become, the overall mesh network connection is modified. For example, with a series of street light poles which are progressively further away from the driver 103, each street light pole may be a router for the following street light pole to wirelessly connect to, so that the series of street light poles are able to wirelessly transmit data to one another to operate, which also allowing other devices or sensors to connect to the mesh network as well. The driver 103 and the control program 106 identify the connection between the devices 107 and is/are able to transmit signals to the distant devices 107 through the mesh network. This also allows for connection of devices 107 off of these gateway, routers, or access point enabled devices 107 so that devices 107 which are not part of the "group" or array are able to wirelessly communicate with the control program 106 and the driver 103 through the mesh network. For example, as above with the street light poles, a smoke detecting sensor connected to a structure and is within the wireless signal of one of the street light poles, is able to use the street light pole's wireless signal to connect with the control program 106 and the driver 103.

This process may also be done manually by the user selecting the device 107 via the network and incorporating it into the network manually and with the proper connection with the group or devices in which it is associated with. A user may then access the computing device 103 to locate the new device(s) 107. Each device 107 may save its own parameters in non-volatile memory, such that it can resume operation after a power failure and to associate the device 107 as desired by the user or the control program 106.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A system for providing power and controlling a plurality of components, comprising:
    a driver;
    a plurality of sensors, wherein the plurality of sensors collects sensor specific data and are in communication with the driver and the other plurality of sensors, wherein a mesh network is formed as the plurality of sensors as nodes within the network and the driver is a gateway within the mesh network;
    a Power over Ethernet (POE) switch, wherein the POE switch is in communication with the plurality of sensors;
    a plurality of devices in communication with the driver, the plurality of sensors, and the POE switch, wherein the plurality of devices are nodes within the mesh network, wherein a power limitation of the plurality of devices and the plurality of sensors is determined and the connection formation of the plurality of devices and the plurality of sensors is identified; and
    a control module in communication with the plurality of devices and the plurality of sensors, wherein the control module determines if the power signal is within a predetermined limitation of the device power limitation and wherein if it is determined that the power signal is not within the predetermined limitation of the device power limitation, restricting the power signal to a predetermined level.

2. The system for providing power and controlling a plurality of ethernet components of claim 1, further comprising,
    a relay, wherein the relay is in communication with the POE switch, and
    an existing building system, in communication with the relay, wherein the relay controls the activation of the existing building system based on commands sent from the control module to the driver, plurality of sensors, or a plurality of switches.

3. The system for providing power and controlling a plurality of ethernet components of claim 2, wherein a local area network is formed from the communication between the plurality of sensors and the plurality of devices and wherein the local area network is a mesh network dynamically connecting the driver, POE switch, relay, the plurality of sensors, and the plurality of devices.

4. The system for providing power and controlling a plurality of ethernet components of claim 3, further comprising, at least one switch, wherein the switch is connected to integrated into the local area network and the driver controls the at least one switch.

5. The system for providing power and controlling a plurality of ethernet components of claim 1, wherein the driver has a capacitor to allow for the driver to maintain a charge, eliminating the plurality of devices activation delay.

6. The system for providing power and controlling a plurality of ethernet components of claim 1, wherein the local power source is able to activate a series of power modes based on received commands.

7. The system for providing power and controlling a plurality of ethernet components of claim 1, wherein the driver allows for a constant-current delivery of power via a wired system and control via a wireless system.

8. The system for providing power and controlling a plurality of ethernet components of claim 1, further comprising, at least one additional driver, wherein the at least one additional driver operates as an additional gateway within the local area network.

9. The system for providing power and controlling a plurality of ethernet components of claim 4, further comprising a plurality of control modules integrated into the driver, plurality of sensors, POE switch, relay, and the local power source.

10. A mesh Power over Ethernet (POE) system, the system comprising:
    a driver, wherein the driver has a control module, and the control module is able to send and receive commands and power;
    a POE switch in communication with the driver, wherein the POE switch sends and receives information from the driver;
    a plurality of components in communication with the driver, the POE switch, wherein an electrical network and individual components power sources are determined and communication ways between the plurality of components connects the plurality of components to the driver;
    a power source in wired communication with the POE switch; and
    a control module connected to the plurality of components, wherein the control module determines a predetermined power limit for each component and determines the additional of a new component to the system and incorporates the new component into the system.

11. The mesh Power over Ethernet (POE) system of claim 10, further comprising, the addition of a new component, wherein the new component is connected to the driver via a direct connection or an indirect connection.

12. The mesh Power over Ethernet (POE) system of claim 11, wherein the mesh network connection path is dynamically adjusted based on the additional of the new component.

13. The mesh Power over Ethernet (POE) system of claim 10, further comprising, in response to a loss of power, the driver initiating a protocol to send a power signal to at least one component, wherein the power signal is calculated based on the at least one component operating requirements.

14. The mesh Power over Ethernet (POE) system of claim 10, wherein the control module processes a first set of data received by a first group of the plurality of components, and generates a set of actions which are sent from the driver to the POE switch to control at least one of a second group of the plurality of components, and wherein the signal is sent through the mesh network of the plurality of components.

15. A method of controlling and connecting components in a meshed power over ethernet (POE) system, the method comprising:
    Establishing an electrical network between a plurality of components and a driver, wherein each of the plurality of components are directly or indirectly able to communicate with the driver, and establishing a set of groups, wherein the set of groups are comprised of like components;
    receiving a set of data from a first set of the plurality of components by the driver, wherein the set of data includes a power limitation of each of the components and the electrical network formation about the first set of the plurality of components;
    processing the received set of data and determining a command to be sent to at least one of a second set of the plurality of components, and determining if the power supplied to each of the components is within the power limitation of each of the components; and determining if a component is added to the system and incorporating the component into the system, wherein the component is incorporated into the system based on the components features, and further adjusting the entire plurality of components based on the newly added component.

16. The method of controlling a device in a meshed power over ethernet (POE) system of claim 15, further comprising, identifying, a set of limitations associated with each of the at least one components.

17. The method of controlling a device in a meshed power over ethernet (POE) system of claim 15, further comprising, dynamically modifying the connections between the plurality of components and the driver.

18. The method of controlling a device in a meshed power over ethernet (POE) system of claim 15, further comprising, receiving of a signal from a first group of the at least one component, wherein the driver receives the signal from the first group of the at least one component and determines if the control module is to modify the power or the control signal to a second group of the at least one component.

19. The method of controlling a device in a meshed power over ethernet (POE) system of claim 15, further comprising, identifying a new component incorporated into the system and establishing a connection of the new component within the system.

20. The method of controlling a device in a meshed power over ethernet (POE) system of claim 19, further comprising, determining the connection type of each of the plurality of components and determining the transfer method of both power and data.

* * * * *